Dec. 22, 1953 G. MUFFLY 2,663,518
AIRCRAFT CONTROL
Filed Dec. 24, 1948 4 Sheets-Sheet 1
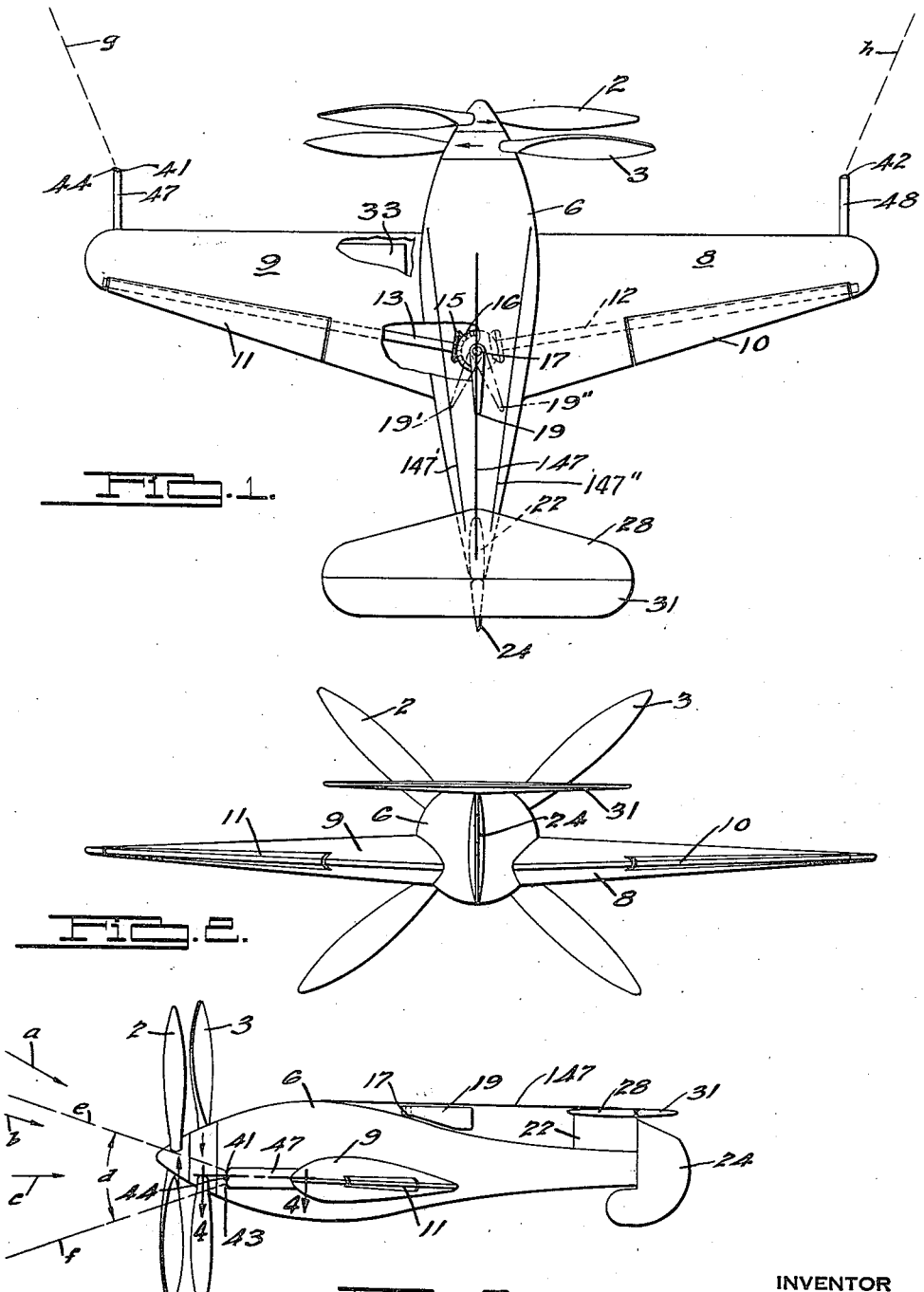
INVENTOR
Glenn Muffly.
BY
Harness, Dickey & Pierce.
ATTORNEYS.

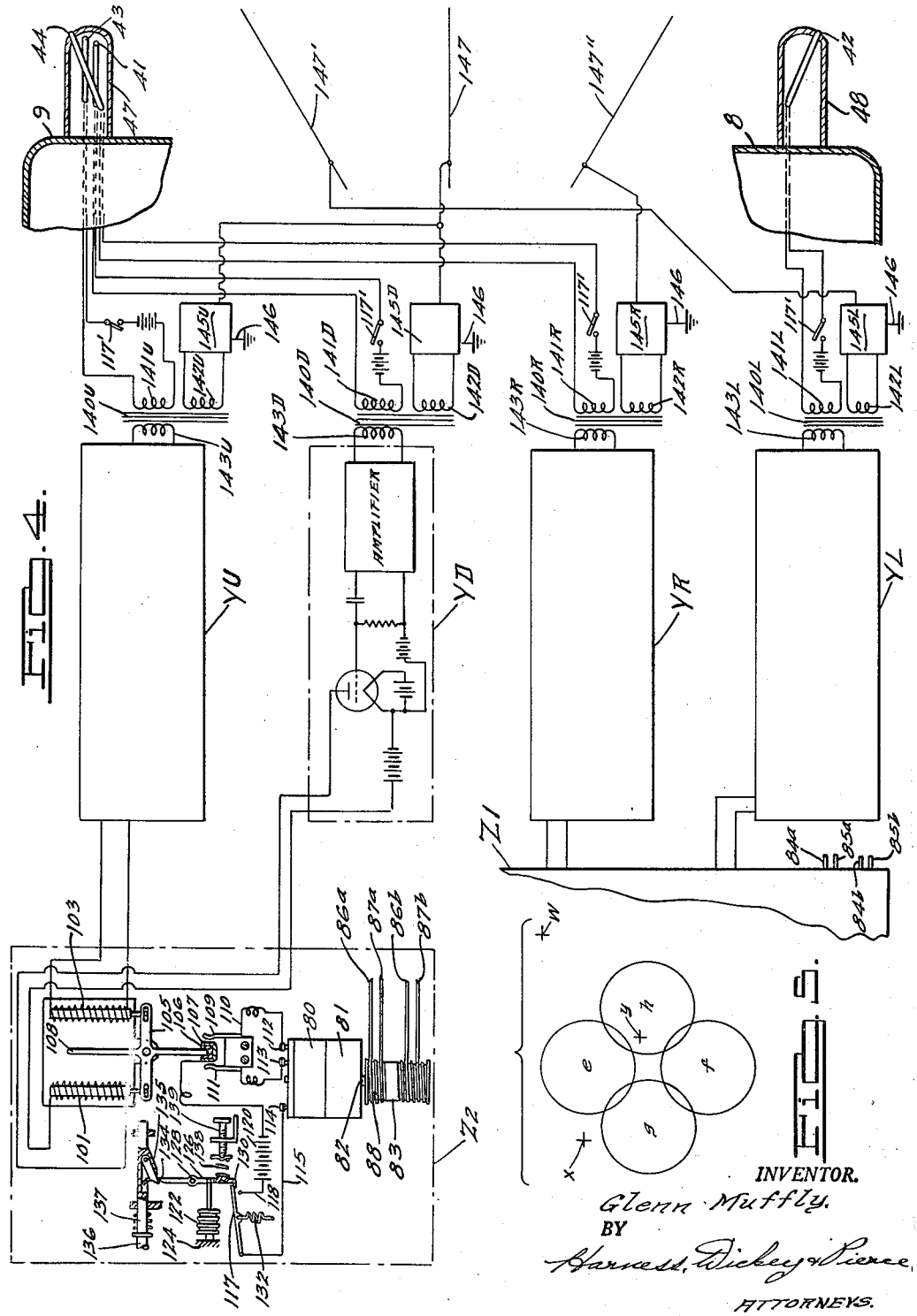

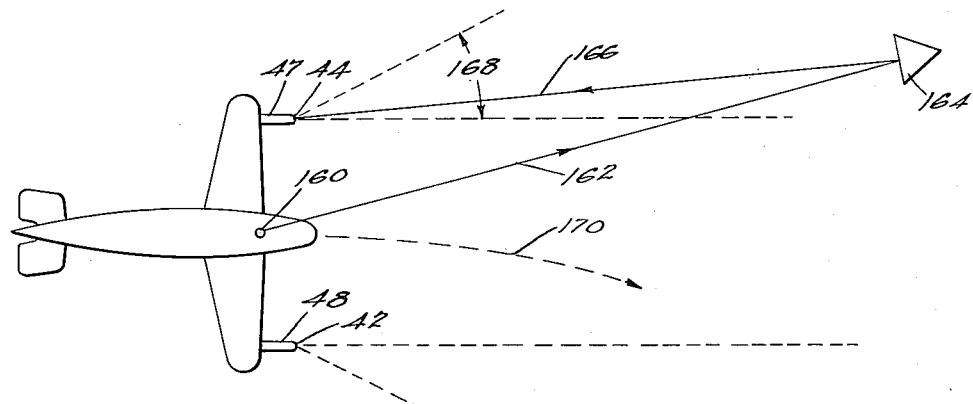
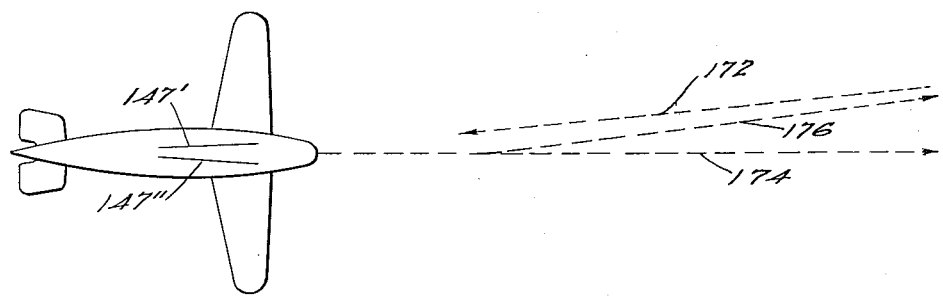
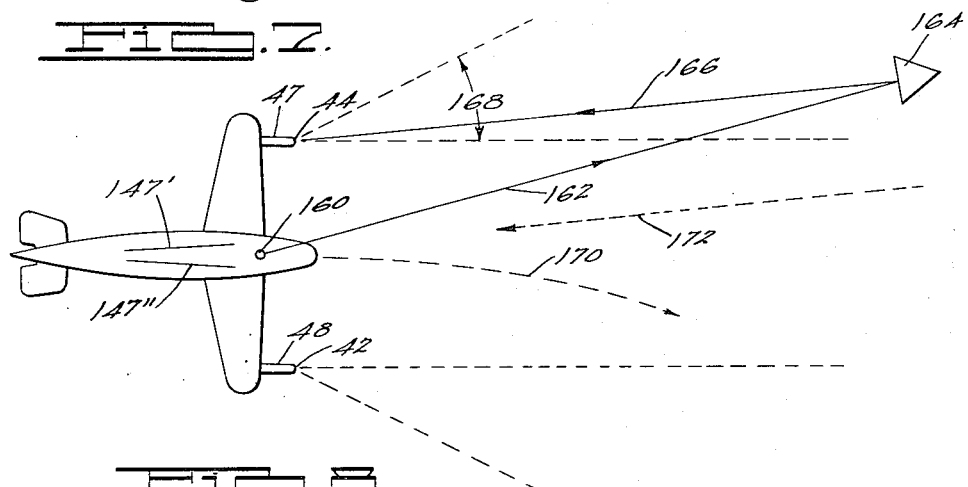

Dec. 22, 1953    G. MUFFLY    2,663,518
AIRCRAFT CONTROL
Filed Dec. 24, 1948    4 Sheets-Sheet 4
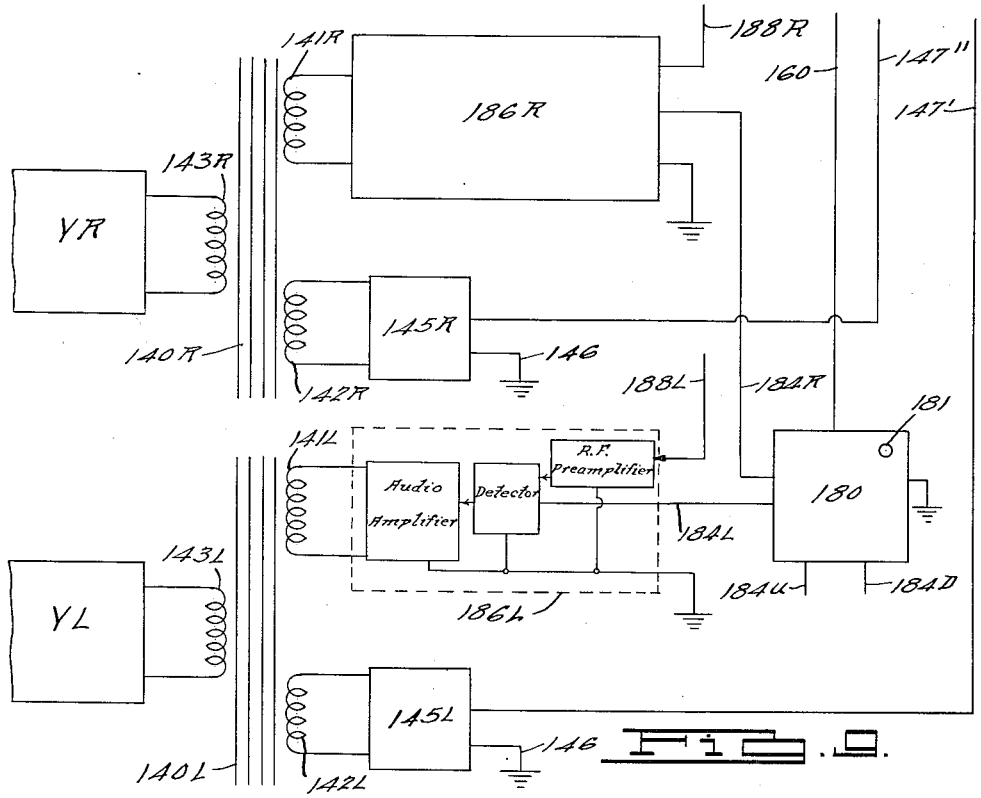
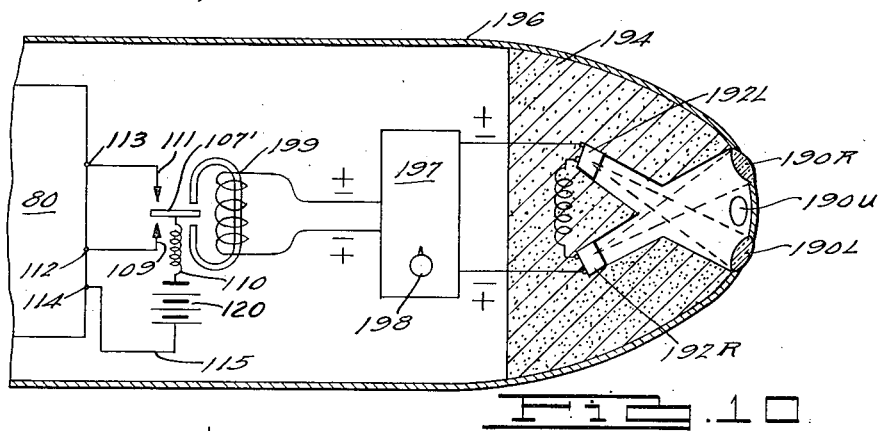
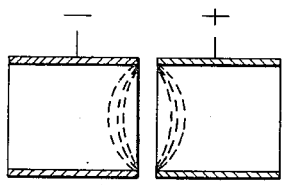
INVENTOR.
Glenn Muffly.
BY
Harness, Dickey & Pierce
ATTORNEYS.

Patented Dec. 22, 1953

2,663,518

UNITED STATES PATENT OFFICE 2,663,518

AIRCRAFT CONTROL

Glenn Muffly, Springfield, Ohio

Application December 24, 1948, Serial No. 67,188

12 Claims. (Cl. 244—77)

This application is in part copied from my abandoned copending application, Serial No. 753,974, filed June 11, 1947 as a division of my then copending application Serial No. 373,050 filed January 3, 1941, now abandoned in favor of said application Serial No. 753,974, and also includes subject matter and claims which are divided from my copending application Serial No. 426,758 filed January 14, 1942, now Patent No. 2,457,393 dated December 28, 1948. This application is directed toward eliminating dangers of collision by providing warning signals and means for causing an aircraft or other vehicle to turn aside from its course to avoid a collision as well as the combination of such collision avoidance means in combination with automatic means for maintaining the aircraft or vehicle on its normal course.

One of the main objects of this invention is to provide an automatic control for the steering means of an aircraft to guide said aircraft in response to a signal resulting from the presence of another aircraft or other object.

A further object is to provide such a response which will guide the controlled aircraft into a collision with the other craft or object or to guide the controlled aircraft to avoid such collision depending upon the intended purpose of the controlled aircraft.

A further object is to provide such control by means of apparatus confined to the controlled aircraft.

A further object of this invention is to provide automatic steering means for an aircraft with an automatic control arranged to cause said aircraft to turn aside and avoid collision with another aircraft in response to a signal resulting from the relative approach of one of said aircraft to the other.

Another object is to provide such control by means of equipment confined to the one aircraft to be controlled.

A still further object is to provide course-following means on an aircraft for guiding said aircraft with reference to fixed stations from which signals are sent and to provide additional means effective independently of said course-following means and arranged to cause said aircraft to turn aside from its regular course in response to a signal reflected from an obstruction which is being relatively approached by said aircraft.

Another object is to provide for projecting reflectable wave energy from an aircraft or other vehicle and reception means on said vehicle responsive to reflections of said wave energy when said reflections are received on the vehicle at a higher frequency than that at which the original energy was generated.

An additional object is to provide for heterodyning a reflected frequency directly with the frequency of the original source to give warning by Doppler effect that a wave generating station and a reflecting body are relatively approaching each other.

Still another object is to provide means on an aircraft to cause it to change its course in response to the relative approach of obstructions, such response being to reflected waves of the greater intensity and/or the higher frequency.

A still further object is to provide target-seeking means for use in warfare to cause instead of to prevent collisions.

These and additional objects will be apparent from the following specification.

This invention may be used independently of or in combination with other devices and methods, particularly those for course following and in the radio field.

In the accompanying drawings, which illustrate suitable embodiments of the present invention and in which like numerals refer to like parts throughout the several different views:

Figure 1 is a plan view of an airplane equipped with the control devices herein disclosed;

Fig. 2 is a rear view of the plane seen in Fig. 1;

Fig. 3 is a side elevation of the plane seen in Figs. 1 and 2;

Fig. 4 is a partly diagrammatic view of the control system for the rudder and elevator of the plane, including section 4—4 of Fig. 3;

Fig. 5 is a diagrammatic view of the listening zones or cones of guidance, indicating positions of other planes, looking forward from the equipped aircraft;

Fig. 6 is a plan view showing an airplane in flight to illustrate its response to a reflected danger signal;

Fig. 7 is a similar view to illustrate the response of the airplane to a course signal received from a remote sending point on the ground;

Fig. 8 is a similar view illustrating the response of the airplane to its controls when equipped with both the danger-avoiding control responsive to a reflected signal and the course-following control which responds to a radio signal originating at a remote point on the ground;

Fig. 9 is a diaphragm showing the necessary connections to be made when both the reflected danger signal and the course-following signal are of the radio type and the heterodyne method is employed to produce a beat note;

Fig. 10 illustrates a modification in which direct and reflected heat, light, etc. is employed in avoiding collision; and Fig. 11 shows an electronic lens for use in Fig. 10.

The plane is to be provided with the usual control surfaces, and is shown with cables running in multiple to a central control mechanism, as illustrated in Fig. 4. These control cables are preferably in multiple and separated from each other for considerable portions of their lengths of run to each of the controls, so that the breaking of one cable will not destroy the control of the plane.

The receiving relay and power assembly of the control mechanism is preferably enclosed in an armored housing. It may comprise separate motors, as shown, or employ power take-off devices so that the power of the engine is available for the actual moving of the control surfaces. Some such source of power is essential in accomplishing the instant response required for quick turns.

The control apparatus on the plane preferably includes radio receivers and relays for actuating mechanical control mechanism on the ship to steer it on its course. This mechanical control mechanism will include means for applying power to the controls of the plane in each direction and optionally for moving the throttle in the opening or the closing direction. This mechanical control mechanism may be in addition to the normal manual mechanism.

It is further contemplated that means for actuating the controls of the plane independently of the course-following radio control will be provided. This additional control means will operate through the same relays and mechanism but will be responsive to sound or other waves indicating danger instead of to course-following radio signals.

It is recognized that the velocity of high speed aircraft represents a considerable proportion of the velocity of sound and that the plane will have some lag in its steering away from a danger zone in response to sound. An alternative method of operation which eliminates this lag, is to employ magnetic or some other radiant energy such as heat, radio or invisible light to guide the plane away from a danger zone. In such event it is apparent that receivers suitable for the type of wave energy employed will replace the microphones described below.

The rate of control movement will be designed to make turns at rates well within the structural limitations of the plane both in turning to avoid danger and in returning to its course. The course-following signals need not be of the same type as the danger signals, for instance the plane may be controlled by means of a beam pattern produced on the ground or by a conventional beam method for following a course while the turning to avoid danger of collision is in response to the Doppler effect of a reflected signal as herein disclosed.

The control for avoiding danger may operate on Doppler effect along the lines of the disclosure in my U. S. Patent No. 2,066,156, arranged by means of relays to actuate the controls to steer away from the higher frequency sound. There will, in the present case, be no need for standardized frequency as called for in my earlier patent since the response is to reflected waves.

As seen in Fig. 3, the left wing has on or adjacent to its leading edge a pair of directional microphones or other receiving devices, one directed at an upward angle and the other at a downward angle. Assuming a reflected sound coming from the direction indicated by the arrow $b$ it will be seen that the upper microphone 41 receives more of this reflected sound than the downwardly directed microphone 43. This effect causes the elevator to be moved downwardly, directing the plane downwardly until the sound approaches it at an angle such as represented by the arrow $a$. This sound still produces a stronger effect on the microphone 41 than it does on the downwardly directed microphone 43, hence the elevator will still be directed downwardly until the sound has substantially no effect on either microphone, e. g., the reflected sound is outside of the cones of reception of the microphones.

When a sound source or wave-reflecting body is located midway within the angle $d$ as at $c$ of Fig. 3, any movement away from the middle of this angle will increase the sound effect on one of the microphones and reduce it on the other, with the result that the plane will alter its path so as to avoid the reflecting body.

In Fig. 1 it is seen that the microphone 42 on the right wing is directed at an angle to the right and the microphone 44 on the left-hand wing is directed at an angle to the left as indicated by the broken lines $h$ and $g$. The rudder is controlled by a relay device responsive to variations of relative reflected sound intensity between right and left, the same as the elevator is controlled by sound reflected from above and below the path of the plane.

Fig. 4 is a partly diagrammatic representation of the control system for the rudder and elevator. The control system for the rudder comprises the wave sensitive devices 42 and 44 directed toward the right and left respectively from the forward course of flight of the plane, transformers 140L and 140R having primary windings 141L and 141R respectively, are connected to the devices 42 and 44 respectively, amplifiers YL and YR respectively supplied with a signal from the secondary windings 143L and 143R of the transformers 140L and 140R, and a rudder actuating mechanism Z1 which receives the output signals of the amplifiers YR and YL and actuates the rudder control cables 84a, 84b, 85a and 85b to steer the plane toward the right or toward the left depending upon the relative strengths of the output signals of the amplifiers YR and YL. The transformers 140R and 140L also have primary windings 142R and 142L respectively which are supplied with energy from the radio receivers 145R and 145L connected to the directional radio antennas 147'' and 147' respectively.

The control system for the elevators comprises the wave sensitive devices 41 and 43 directed upwardly and downwardly from the forward course of flight of the plane, transformers 140D and 140U having primary windings 141D and 141U respectively and connected to the devices 41 and 43 respectively, amplifiers YD and YU respectively supplied with a signal from the secondary windings 143D and 143U of the transformers 140D and 140U, and an elevator actuating mechanism Z2 which receives the output signals of the amplifiers YD and YU and actuates the elevator control cables 86a, 86b, 87a and 87b to cause the plane to descend or ascend depending upon the relative strengths of the descending signal of the amplifier YD or the ascending signal of the amplifier YU. The transformers 140D and 140U also have primary windings 142D and 142U respectively which are supplied with energy from the receivers 145D and 145U connected for energization from a suitable antenna 147. In this instance the receivers 145D and 145U may be tuned to receive signals of different carrier wave length which signals may be selectively transmitted from a control station as necessary to vary the altitude of the plane. It is also possible to have the two receivers 145D and 145U sensitive to radio signals of the same radio frequency but one receiver responsive to one type of modulation and the other receiver responsive to a different type of modulation.

It will be obvious that under many conditions of operation it may be desirable to omit the receivers 145U and 145D and to provide some other source of control such as an altimeter for maintaining the plane within controlled altitude limits and to utilize the rudder control for directing the plane toward its destination. This automatic altitude control could be entirely omitted in the case of a plane having manual controls and the altitude at which the plane flies be entirely under manual control. Also under some other operating conditions the up and down safety controls might be dispensed with and the avoiding of collisions be carried out in a single plane by right and left steering. The control surfaces of the plane are operated by a power take-off from the engine, by compressed gas, or by some other power source such as the electric motor 80 and gear reduction 81. On the slow speed shaft 82 of the gear reduction is a drum 83 on which are wound the control cables for the rudder or the elevator as the case may be. Cables 86a and 87a are preferably one piece, but in any event both are anchored to the drum as at 88. Rotation of the drum 83 in the direction to wind up cable 86a and unwind cable 87a raises the elevator 21 of the plane. Cables 86b and 87b are duplicates of 86a and 85a preferably running a little distance from them, as a provision against loss of control in the event of one cable being broken by accident. A similar drum 83 and set of cables 84a, 84b, 85a and 85b, with a motor and reduction gear or equivalent power means, is used to operate the rudder.

Each of these drums is under control of a pair of receivers or directionally sensitive pick-up devices adapted to be influenced by sound, heat, light, radio or other suitable reflectable wave energy. For illustration I show in Fig. 4 the microphone 41 arranged for directional reception of sound from an upward angle at the leading edge of the wing 9, and a similar microphone 43 arranged for response to reflected sounds coming from points ahead of and below the path of the plane. The microphone 43 has its output connected through the transformer 140U and amplifier 144YU to operate the solenoid 103. The effect is that a reflected sound of such frequency, force and direction as to be effective on microphone 43 causes the solenoid 103 to be energized in the direction to lift the right-hand end of rocker 105, causing contact 107 (insulated from 105 by means of 106) to engage contact 109, so connecting wire 110 with terminal 112 to operate the motor 80 to lift the elevator. This causes the plane to climb to avoid the reflecting body ahead of and below it. Microphone 41, the amplifier YD, solenoid 101 and contact 111 act to reverse the motor 80, dropping the elevator.

The contact between 107 and 109 or 111 has no effect on the motor 80 until the circuit is completed from the motor 80 through terminal 114, wire 115, switch 117 and wire 118 back to the battery 120. The closing of switch 117 can, of course, occur at any time and be closed before the plane leaves the ground but generally it is desirable to initiate flight by some other means such as manual control so that the closing of switch 117 preferably occurs after the plane has reached an approximately predetermined altitude, as measured by atmospheric pressure. The bellows 122, supported by fixed member 124 is charged with air or other gas and its free end is connected with member 126, the latter being pivoted at 128 and provided with the hook 130 for retaining switch 117 in the open position. When the plane has attained an altitude of sufficiently low atmospheric pressure the bellows 122 will expand under the action of the gas trapped within it, pushing the hook 130 out of engagement with the switch 117, which is constantly urged in the closing direction by the spring 132. When switch 117 is once closed it normally remains so, though in some variations of my invention automatic or remotely controlled means may be provided for reopening the switch 117.

It will be understood that there is a switch 117 for each of the two motors 80, or there is a switch 117' for each of the four microphone circuits. These switches are operable manually by the pilot to discontinue the automatic steering of the plane, as in landing or taking off. The microphone 41 is connected to actuate solenoid 101 by a duplication of the parts shown for operation of solenoid 103. Another pair of microphones and a second motor 80 and drum 83 with similar cables 84a, 84b, 85a and 85b gear reduction and electrical apparatus are arranged to actuate the rudder 24 in response to reflected sounds picked up from right and left of the direct straight-ahead path of the plane.

The four directionally shielded microphones may be located on the plane as indicated in Figs. 1 and 3, or they may all be located at one point. For convenience of illustration I have shown three microphones on one wing and one of the sidewise (rudder actuating) microphones on the other wing. For uniformity of air resistance it may be preferred to mount two microphones on each wing. In any case the microphones or other radiation receiving devices will be arranged to be sensitive to the presence of an obstruction in or near their respective diverging directional cones or "beams," using the word "beam" to define a cone of reception instead of a cone in which a signal is sent.

In Fig. 5 we see four interlaced circles which represent a section through the four "beams" or cones of reception, as they would be viewed from the plane in flight, looking forward. The small crosses $w$, $x$ and $y$ represent positions of planes in the sky ahead, though these planes may be invisible on account of clouds or distance. The plane $w$ is above and to the right of all four of our cones of reception, but some of the sound reflected from it will be picked up by cones $e$ and $h$. Likewise plane $x$ is in position to have some effect on cones $e$ and $g$, but plane $y$ is actually in cone $h$. Unless $w$ or $x$ is much closer to our plane than is $y$ the effect will be to energize the rudder motor to turn to the left until the plane $y$ is in the area outside of the four circles. The plane $y$ may then move into any one of our four cones of reception, which will affect our control of the elevator or the rudder to steer the plane away from it again.

It should be borne in mind that cones $e$, $f$, $g$ and $h$ are interlaced or very near together from a point quite close to the plane out to a distance of several miles. They may interlace to the extent of leaving no space between them, but there will be still a neutral line between $e$ and $f$, with another neutral line between $g$ and $h$. At the crossing of the two neutral lines is a position at which an obstruction will have no effect to change the path of the plane, but the slightest momentary deviation from this relative position or change of response of one of the receivers will produce an effect to steer the plane away from danger of collision.

Assuming that $x$ suddenly comes in from one side and much closer to our plane, the effect of the plane $x$ may be so strong on cones $e$ and $g$ as to overbalance the effect of the more distant plane $y$ and cause the plane to dodge plane $x$ instead. Now if another plane cuts in still closer to our plane or is being more rapidly approached by it, the course may again change, but our plane will always be taking a path to avoid the nearest danger point as measured in time. See my U. S. Patent No. 2,066,156 for further details on receiving and detecting a signal having its frequency increased by relative approach.

The receiving equipment is made selective as to the frequency band in which the maximum response is desired. This band is higher than the sent frequency, hence there is an increasing response as the received frequency goes higher and approaches the maximum sensitivity of the receivers. The effect of an increase of frequency due to more rapid approach in combination with the naturally greater response to a stronger reflection from a nearer object results in avoiding the greater danger, whether it be because of nearness in distance or because of more rapid relative approach.

Referring again to Fig. 4, it is seen that each transformer core 140 has two primary windings 141 and 142, but only a single secondary winding 143. In the control by the dodging method above described, using sound, heat, radio, invisible light or other waves, we employ a primary winding 141 in each of the four transformers. The switches 117' may, however, be opened manually or by other means and automatic operation taken over solely by radio receivers 145. The four coils 142 will then act without opposition of the primary coils 141 and the plane will be subject to radio control from a sending station on the ground or other control point, except as the plane may be manually controlled.

Planes may be equipped with the dodging controls only, with the course-following controls only or with both, according to the method of operation selected.

Switches and other operating parts are balanced to prevent improper movements due to centrifugal force at the time of quick turns. For example, the armatures of solenoids 101 and 103 are balanced by the rocker 105, on which only the net magnetic force is effective. Centrifugal force acting on the lower arm of 105 is balanced by that of upper arm 108. Similar provisions are to be made wherever required.

An adjustment is provided for the bellows 122 so that the switch 117 may be set to close at the desired altitude. The spring 138, acting against bellows expansion, is adjusted by means of screw 139 and a micrometer type graduation to the atmospheric pressure at which it is desired that the switch 117 shall close. Having the local barometric pressure this setting may be made quite accurately for the desired altitude.

The same bellows 122 may be used to actuate other switches or mechanisms during ascent or descent as desired. For instance the switch 117 may be made to close and open with a conventional toggle spring, thus re-opening the switch in case the plane approaches the ground. This will keep it from being affected by a motor truck, a building or other objects in the ground. The pointed end 134 of lever 126 engages pawl 135 at high altitude and moves rod 136 to the right, compressing spring 137 upon return to higher atmospheric pressure, where it may be set to release again. Rod 136 is connected with any desired control to actuate it.

Another use of the bellows 122 would be to reclose a switch or switches to again make the plane respond to radio control alone when it nears the ground.

The microphones 41, 42, 43 and 44 are so designed and mounted in streamlined housings 47 and 48 as to minimize the sound effect of air passing over them. While there will unavoidably be some sound effect on the microphones from this source, the effects on the two opposed microphones will be balanced by their similar form and mounting.

With our present knowledge of aero-dynamics the velocity of the plane may be about ⅔ that of sound in air. This means that while sound travels from the engine three feet in the direction of a wing tip, that wing tip will have moved forward two feet, hence the sound of the engine cannot be carried directly through air to the microphones on the wing tips, and consequently the sound which is received by the microphones can only be that which is reflected from the danger zone or object. It will be appreciated that the plane engine may be utilized as the means for transmitting reflectable wave energy, in this case sound which when reflected from a danger zone or object actuates the dodging controls.

The microphones are located forward of the wing tips and so directed that they not only avoid picking up the sound of the plane's engine but likewise avoid picking up direct sound vibrations of the propellers. With properly damped and insulated mounting of the microphones they will be subject to very little sound except that of air passing over them and that reflected from objects in or near one of their cones of reception.

During straight flight there will be a uniform air noise received by all four microphones. It is the excess sound indicating an obstruction in or near a cone of reception which causes the plane to turn away from the direction from which this sound comes. The utilization of the relativity of plane speed to sound speed for preventing direct reception of the frequencies of the plane's own engine and propellers is one of the important features of this invention. The tuning out of sent and lower-than-sent frequencies may be done by the receiver or by a tuned oscillator, as in Fig. 11 of my Patent No. 2,066,156.

Unlike the method of this earlier patent the present method does not require special equipment on all airplanes. Any plane equipped with the devices herein disclosed will be caused to steer clear of other aircraft, whether or not they are similarly equipped.

Another method of using my present invention for the purpose of safety is to keep the electrical connections associated with 21 as shown, which are arranged to actuate only the rudder in response to received reflected waves of radio, sound or other type. The plane may retain the motor and gear means for actuating the elevator, but instead of the microphones 41 and 43 and their amplifying devices employing pressure-operated switches to energize the motor 80 to turn downwardly at a predetermined low atmospheric pressure and upwardly in response to an increase of atmospheric pressure to a predetermined maximum which represents the minimum desired altitude.

When so equipped a plane will fly within certain altitude limits and be steered on its course except for turning aside to avoid danger. As it flies over the signal station it will become responsive to the next one, nearest to the direct line of flight, unless the human pilot steers it to start in the direction of some other sending station.

The use of the safety steering device to avoid collision with another plane or an obstruction need not conflict with the use of the device for steering in the direction of a ground objective on the course, since the signal toward which it is desired to go is preferably a radio or supersonic signal while the one to be avoided is of a quite different frequency and may be within the audible range. The plane would merely be equipped to receive both types of signals, as in Fig. 4, but the short range reception means would be designed to overbalance the long range reception means when the danger is imminent and the course signal acting on one solenoid is overbalanced by the danger signal acting on the opposed solenoid of the same rocker 105.

The coils 142 used for control by radio are the output coils of radio receivers 145. These receivers may be made responsive to beam signals or directionally responsive to broadcast signals. In the first case the reception of the right-hand beam of a pair such as now in common use will energize the coil that causes a turn to the left and vice versa, while the reception of the constant signal in the middle of the dual beam will allow the rudder to remain unmoved at whatever angle is required to compensate for drift. In the second case it is proposed that the aerial be adjustable to compensate for drift by varying the angle of reception relative to the fore-and-aft axis of the plane.

The radio receivers 145 have their output terminals connected to respective coils 142 of the transformers as shown in Fig. 4. Normally there will be four of these receivers 145, namely 145R, 145L, 145U and 145D having aerials. One of the leads 146 of each receiver 145 goes to a ground connection and the other to one of the aerials. The connections from the microphones are such that microphones 41 and 43, acting through their respective amplifiers YD and YU act upon solenoids 101 and 103 so that the signals received by 41 and 43 are amplified and balanced against each other by the rocker 105 of the switch mechanism. This assembly, including motor 80 and gear mechanism 81 is duplicated in association with the other pair of microphones 42 and 44, the gear reduction 81 being connected with the rudder.

The receivers and amplifiers will have their outputs so proportioned that the solenoid pull exerted in response to reception of the danger signal, herein often referred to as sound, will overcome any pull of the opposed solenoid of the same pair exerted in response to the course-following signal, herein often referred to as a radio signal, thus causing the plane to turn to the right to avoid a collision when both signals come from the left, but to continue on its course under control of the course signal when no other plane or reflecting body is being relatively approached. The pilot may open switches such as 117 and 117' and operate the controls directly by either manual or motor power when he so desires.

Since the several microphones or other receivers are each tuned to have a peak of response above the dominant frequency produced on the plane any one receiving a higher frequency will dominate its mate which receives only the frequencies produced on the plane, or reflections thereof from a more slowly approaching object.

Where any detail has not been included in the drawing or specification it is to be understood that I plan to use a feature disclosed in my U. S. Patent No. 2,066,156 or one of the more or less conventional devices now known in the art.

It is to be understood that this is a broad general description of a new type of aircraft control, with many possibilities for variations in the details of construction. For example, I have in some parts of the specification referred to microphones and the reception of sound, but it is to be understood that I may employ in place of the microphones any suitable device for reception of some other type of wave energy. The devices 41, 42, 43, and 44 may be thermocouples for reception of heat or devices responsive to other wave energy produced on airplanes or fixed stations. The wave energy may be either audible or supersonic, either generated on the obstruction or reflected from it. Wave energy may be electrical, magnetic, atomic, of radio frequency, in the heat band, visible or invisible light, or of any other type which can be detected by suitable receiving means on the aircraft to be controlled.

The aerial 147 may be made directional for some modifications of this invention calling for directional reception. Two or more aerials, as indicated by 147' and 147", may be employed for selective reception from right and left or up and down.

Some principles disclosed in my issued Patent No. 2,066,156 are employed herein. The frequency changing effect due to relative velocity of sending and receiving points is illustrated in the issued patent by Figs. 1 to 5 inclusive and its application to aircraft in the other figures.

The present invention employs the same basic principle of Doppler effect, but in an improved manner. It provides for receiving reflected waves on the vehicle from which the original waves were sent, thus the sent frequency itself is available for comparison by the heterodyne or beat note method to determine the frequency difference which is a measure of relative velocity between the moving vehicle and the reflecting object.

This feature of using reflected waves not only eliminates the need for equipping all aircraft and keeping separate pieces of equipment closely tuned to a standard frequency, but it provides a much greater Doppler effect and hence a more easily detected beat note. In the issued patent above mentioned an equipped plane approaching a fixed sending station located at a danger point, as shown in the lower right-hand portion of Fig. 6 of that patent, would receive the danger signal with one step of Doppler effect increase of frequency, subject to a probable error of tuning of the stationary sending set and the moving receiving set to the same standard frequency. In the present application a signal sent from the aircraft is reflected by the mountain top and received back on the same aircraft, where its Doppler effect is more easily detected, since the frequency of the reflected waves is compared directly with the frequency of the sent waves and there is a Doppler effect increase of frequency in both the sending and the receiving.

The method of calculating the frequency change is explained in connection with Figs. 1–5 inclusive of my issued Patent 2,066,156. In the case of reflection from a fixed object the condition is that of the signal being sent from the reflecting object at the same frequency as that which strikes the object. This frequency has one Doppler effect increase in it as reflected and there is another as it meets the approaching aircraft. Assuming that the plane is flying directly toward the mountain at ⅕ of the velocity of sound (about 150 miles per hour) and that sound is being sent from the plane at 1000 per second, we find that the frequency striking and reflected from the mountain is 5/4×1000 or 1,250. This is an increase of 25% or 250 per second and this beat note is nearly middle C on the musical scale.

The Doppler effect as either a reflection or a direct signal is picked up by the approaching plane flying 150 miles per hour is the ratio 6/5, thus the 1250 reflection becomes 1500 as received back on the plane which sent the original signal. If a signal of 1000 per second were sent from the mountain, as in the issued patent, the signal received by the plane would be at a frequency of 6/5×1000 or 1200 per second. This would produce a beat note of 200 per second as compared with 500 per second with the reflection method. Should the waves be reflected by another plane flying in the opposite direction at the same speed the original frequency of 1000 would be increased in the ratio of 5/4 as sent, of 6/5 as it strikes the approaching plane, of 5/4 as waves are compressed by velocity of the reflecting plane and again by the ratio of 6/5 as picked up on the plane from which the original signal was sent. This gives 1000×5/4×6/5×5/4×6/5 equals 2250 as the frequency of the received reflection. It is therefore seen that the problem of detection of the beat note or heterodyne effect is simplified by the use of reflected waves, particularly as the standard used for comparison is the original frequency of the waves sent from the same plane and not merely an agreed standardization assumed to be observed in equipping all aircraft and ground stations.

The calculation of beat note or Doppler effect can be made by dividing the wave length into the distance that the plane or the reflecting body moves in one second, obtaining the same result for reflection from a fixed obstruction as follows:

The original waves are 1.088 ft. long.
The plane flies 217.6 ft. per second.
1000 waves sent occupy 870.4 feet.
Waves striking and reflected by the fixed obstruction are therefore 0.8704 ft. long.
The sending plane meets 1088 plus 217.6 feet of waves per second, or 1305.6 ft.
1305.6/0.8704 equals 1500 waves, or 500 more than sent per second.

From this it is seen that when Doppler effect is calculated by wave length we need not take into account the velocity of wave transmission, hence the heterodyne or beat note of radio waves is the same as on sound waves of the same length. Detecting a beat note of 500 per second with radio waves 1.088 ft. long would require very close tuning with the sending station and the receiving station separated, but with the original frequency available for production of the beat note this becomes a simple matter.

While it might be found expedient to send the signal in pulses, i. e. to suspend sending but continue generation of the sending frequency while receiving the reflected signal, this method is not to be confused with the method of measuring distance by the time-lag or so-called "phase-shift" method. My system is responsive to relative velocities whereas the common "pulse-echo" system is a means for determining distance. In pulse echo systems it is common practice to generate the pulses by varying the sending frequency while in the present invention the frequency produced on the equipped plane is maintained constant whether or not the sending is continuous.

With respect to the slight variation of sent frequency due to frequency fluctuation of the current source, which may be a 400 cycle generator, it is only necessary to calculate the time required for a radio signal to travel twice the short distance between the equipped plane and the most remote reflecting body that it is desired to detect. Assuming that it is desired to pick up reflections from objects within a radius of ten miles, the twenty mile round trip of the radio waves would be made in slightly over 0.0001 second, which is only 1/25 of a 400 cycle wave.

This would not allow time for any appreciable change of frequency of wave generation.

The above calculations are for direct approach. The Doppler effect is less when the reflecting body is at one side of the path of the plane, zero for 90° and negative when back of the plane.

There is a negative Doppler effect due to reflection from a departing plane, but if the reflecting plane is being overtaken the negative effect is overbalanced by the positive Doppler effects of sending from and receiving on the equipped aircraft. These variations add up to a higher beat note for a higher rate of relative approach and the strength of the received reflection is stronger when the distance is less, therefore both variables are in the direction of making the greater danger the more easily detected.

As explained in my issued Patent No. 2,066,156 (page 5, col. 1, lines 57–75) the receiving apparatus is tuned to be substantially non-responsive to frequencies lower than the sent frequency so that an object relatively departing will cause no beat note to interfere with those caused by an approaching object.

In the case of a signal originating at a fixed point the ratio of increase of frequency is greatest when the aircraft carrying the receiving set is moving directly toward the sending station and becomes negative when departing. This provides a means for finding the most direct course to any fixed sending station as described in my issued patent. The same result of greater Doppler effect is produced when approaching a danger point, but the response is in the present case to turn and avoid collision.

The sending device may be one of those disclosed in the issued patent, a radiation of the power plant of the equipped aircraft, or any suitable wave generating set capable of producing the desired form of wave energy and radiating it. The receivers for reflected waves will correspond to the type of signal sent from the plane as the microphones shown do to sound produced by the power plant of the equipped plane or by the horns shown in my issued patent above mentioned. Whether sound, radio or some other type of wave energy is employed the receivers intended for reflected waves are preferably tuned to receive only those frequencies in a band extending upward from the sent frequency. The higher frequencies are preferred in either sound or radio, as their Doppler effects are more easily detected.

It will be noted from the calculations above that when sound is used there is a large ratio of frequency change between the sent and the received sound waves, even at rather low relative speeds of aircraft, and this difference is still greater when reflections are used than in the method disclosed in my U. S. Patent No. 2,066,156. This simplifies the selective reception or selective amplification of the higher frequency reflections.

The objects of the present invention can be attained either by using tuned microphones or other receivers adapted for the type of wave energy selected, or by using amplifiers in which the lower frequencies are eliminated. This tuning need not necessarily be so sharp as to reject absolutely all received waves below the frequency of the sent waves, as the beat notes themselves can be tuned out in their lower range of frequencies or the control made responsive only to beat note frequencies which result from speeds of relative movement which would be considered dangerous of they were resulting from relative approach. Also the apparatus will naturally be less responsive in its marginal zone of frequencies between those rejected and those to which it is responsive, causing the response to fade and produce no action of the control apparatus when the Doppler effect is very small or in the negative direction.

The Doppler effect frequency for either sound waves or high velocity waves of the radio type depends upon the number of wave lengths that the receiving plane moves per second toward the source or reflecting object, hence the beat note between the frequency received and the frequency generated on the plane is the same for any two kinds of waves which are of the same length and is higher for shorter waves. A receiver moving at 60 miles an hour toward a source (or reflecting body) from which waves four inches (about 10 mm.) long are coming will meet 264 waves per second in addition to the number it would receive if not moving, so the beat note is about middle C on the musical scale regardless of whether they are sound waves traveling 1088 feet per second or radio waves traveling 186,000 miles per second. Such a frequency shift is easily detected when the original sent frequency is available for use in producing the beat note, as it is in the case of a reflected signal. Also this beat frequency is for the single Doppler effect of reception whereas in the case of reflection there are at least two Doppler effects and if the reflecting body is also moving in an approaching direction there are four Doppler effects, all tending to increase the beat note frequency. If the amplifier is tuned to reject marginal frequencies of beat notes both plus and minus up to 132 per second we still have a signal one octave below middle C to indicate the single Doppler effect of a 60 mile per hour approach and in the case of a reflected signal it will be much higher.

I also plan to use the equipment and methods herein disclosed for diametrically opposite purposes, i. e. to cause collision between aircraft. This is accomplished by the simple expedient of crossing the wires leading to binding posts 112 and 113 in Fig. 4. This will be useful in warfare to cause a robot airplane or missile so equipped to turn in the direction of an enemy and cause a collision with such enemy vehicle or installation coming within the robot's cones of reception of sound, heat, etc.

In the case of such a robot weapon carrying no human pilot the steering mechanism must, of course, be automatically actuated in response to the received signal, but a plane operated by a human pilot may be equipped with a warning signal in place of the automatic mechanical pilot and still include the main features of this invention.

Due to the trend toward higher aircraft speeds it is, however, advisable to provide more than an audible or visible signal to call the human pilot's attention to a danger of collision. The present invention includes means for actually steering the plane away from the direction in which danger threatens, thus eliminating the lag due to human reaction time. Course piloting may be under manual or automatic control but the automatic dodging of danger with mechanical power actuation of control surfaces provides quicker response than is possible with manual operation of the aircraft controls.

Figs. 6, 7 and 8 illustrate the effects of the apparatus hereinbefore described, assuming for the sake of illustration that an airplane as seen in Fig. 1 is equipped with receivers 42 and 44 connected for operation of the rudder and also with aerials 147' and 147'' connected to operate the same rudder in a course-following method.

Fig. 6 illustrates the operation of the plane if equipped with the control for avoiding danger only. The signal to be reflected originates on the plane at 160. This signal may be constantly transmitted in all directions or may be of a rotating beam type. It is preferably of a shortwave, readily reflected variety as hereinbefore mentioned. This wave emanation traveling on the line 162 strikes the obstruction 164 which may be a fixed object or another aircraft. When the reflection 166 falls within the cone of reception 168 of the receiver 44, the received signal is amplified by the amplifier YR shown in Fig. 4. According to the foregoing description, there are four amplifiers, two arranged to operate the elevator of the plane and two arranged to actuate its rudder. We are now considering the amplifier YR which receives its signal from the receiver 44 and is connected to cause actuation of a motor of apparatus Z1 which controls the rudder cables 84a, 84b, 85a and 85b. The reflected signal received at 44 is thus amplified to actuate a solenoid, such as 103, to close the relay switch which energizes the motor for operation in the direction which causes the rudder to turn to the right, thus steering the plane on the path indicated by the broken line 170 so as to avoid the obstruction 164.

The receiving apparatus is tuned to be responsive to frequencies higher than that sent by 160, as previously explained and is increasingly responsive as the reflected signal is increased by Doppler effect, thus in the event that the reflecting body 164 is another airplane moving relatively away from the equipped plane there is no response and the equipped plane continues on its course. If the reflecting body 164 is a plane flying in the opposite direction, the Doppler effect is greater and thus the received reflection approaches more nearly to the frequency at which the receiver 44 has its maximum sensitivity. This increase of sensitivity as the frequency goes up may be further augmented by use of apparatus described in connection with Figs. 3 to 8 inclusive of my copending application S. N. 426,758, now Patent No. 2,457,393 issued December 28, 1948. This description with reference to Fig. 6 may be applied to operation of the elevator instead of to operation of the rudder if the plane is equipped with four receivers as hereinbefore described. In that case, assuming the obstruction 164 to be at a higher level than the equipped plane the reflection will be received by 41 of Fig. 4 and will energize the one of the motors 80 which operates the elevator to turn the elevator downwardly at its rear so that the plane dives to avoid the obstruction. The advantages of this invention are, however, obtainable with only one pair of receivers 42 and 44 arranged to operate the rudder as illustrated diagrammatically by Fig. 6. If desired a scheme such as that shown in Figs. 7 and 8 of my copending application Serial No. 426,758 could be used and in such event polarized relays as shown therein would be used in place of the relays having the separate solenoids 101 and 103.

Fig. 7 shows the equipped plane following the course signal which radiates on the line 172 from a fixed sending station. This course signal is assumed to be of the radio variety and to be received by the directional aerials indicated at 147′ and 147″. As shown in Fig. 7, it is assumed that the plane is headed along the line 174 somewhat to the right of the desired course so that the signal 172 is received by 147′ more effectively than by 147″ and acts through the receiver 145L and its associated amplifier YL to actuating a motor corresponding to motor 80 of Z2 to turn the rudder to the left, thus causing the plane to turn to the left along the line 176 more nearly in line with the course signal 172 which then falls midway between the aerials 147′ and 147″.

Fig. 8 shows the plane equipped with both types of receiving devices as well as with the means 160 for sending the reflectible wave emanations. In this case the condition shown by Fig. 6 is imposed upon the condition shown by Fig. 7. The course signal received by the aerial 147′ produces an effect on one of the solenoids, such as 101 or 103 of Fig. 4, tending to move the switch member corresponding to 107 so as to cause a turn to the left. For illustration let us say that the course signal has energized a solenoid corresponding to 103, thus tending to cause a corresponding 107 to make contact with its 109 and thereby actuate its motor 80 in the direction which moves the rudder to the left, so as to steer the plane toward the source of the course signal.

We have, however, a reflected signal 166 reaching the receiver 44 which is connected through its amplifier YR to energize the corresponding solenoid 101 and, as previously explained, this response is arranged to overbalance the response produced by the course signal and, therefore, its switch member 107 is moved into contact with 111 instead of 109, thus energizing the motor to turn in the opposite direction and move the rudder to the right so that the plane turns to the right to avoid the obstruction 164. The plane continues on the modified course until the danger has been passed and the plane then automatically responds to the course signal 172 which arrives more nearly in line with 147′ than with 147″, hence the effect is to cause the plane to turn to the left again in the direction from which the course signal is received.

The course signal 172 when the plane is on course causes equal intensity signals to be received by the antennas 147′ and 147″ and consequently the receivers 145L and 145R are supplying substantially equal output signals to the transformers 140L and 140R. The reflected signal 166 is actuating the receiver 44 which supplies a signal to the transformer 140R so that the amplifier YR produces a stronger output signal than the amplifier YL and the plane is caused to turn toward the right. As the plane turns to the right the output signal of the radio 145L becomes more intense and this increase in intensity is progressive as the plane turns further from its normal course. At some point the output of the amplifier YL equals that of YR and further steering of the plane away from the course ceases. This balance will be maintained while the plane is passing the obstruction 164 but after passing the obstruction there is no reflected signal and the receiver 44 no longer actuates the amplifier YR. This permits the amplifier YL to overbalance the relay in Z1 actuating the associated motor for moving the cables 84a, 84b, 85a and 85b steering the plane to the left onto the correct course at which time the outputs of the amplifiers YL and YR are again balanced.

While it is essential to have more than two receiving devices such as 41, 42, 43 and 44 to steer a target-seeking plane as described in the several parent applications, it is not necessary that all four receivers be employed on a man carrying plane where manual piloting is available. Where a man-carrying plane is equipped with the complete apparatus for operating both the elevator and the rudder, the human pilot may at his option open one or more of the switches 117 or 117′ to cut out either the automatic actuation of the rudder, the automatic actuation of the elevator, or both.

In the foregoing description relative to Figs. 7 and 8, it is assumed that the plane is flying in still air. It will be understood, however, that the aerials 147′ and 147″ are adjustable so that a line bisecting the angle between them will represent the line of movement relative to the earth when following the course signal. Such devices for adjustable directional reception are well known and hence not illustrated herein.

The short wave sending apparatus 180 of Fig. 9, which is carried by the aircraft, has an aerial 160 and is connected by means of wire 184L with the heterodyne receiving unit 185L to provide therein a frequency equal to the sent frequency for the purpose of producing a beat note between this sent frequency and the frequency received by 186L through its aerial 188L. The aerial 188L is a directional aerial and is responsive to receive with greatest effect reflected radio waves approaching the plane from a direction toward the right of the line of forward movement of the plane. The antenna or aerial for the receiver 186R likewise is directional and receives with the greatest effect reflected radio waves approaching from the left of the forward path of movement of the plane. The receiving unit 186L is tuned to be responsive only to a band of frequencies higher than the frequency produced by 180, hence its beat note output to coil 141L of transformer 140L occurs only when the received frequency is higher than the sent frequency.

The separation of sent and reflected frequencies is facilitated by using the double heterodyne method in 186L. Suitable shielding of aerials is provided, particularly between 160 and the aerials 188.

The coil 142L, the radio receiver 145L and aerial 147' act in response to a course signal as described in connection with Fig. 4. It will be understood that if both the elevators and rudder are to be controlled two of the Fig. 9 assemblies are included as in Fig. 4. The sending devices 180 and 160 do not require duplication. A wire 184R leads to the other unit 186R, or wires 184R, 184U, and 184D lead to units 186R, 186U and 186D, respectively so that all of the receiving units are dependent upon the same source for the production of their base frequency. The device 180 is provided with tuning knob 181 whereby the frequency of the transmitted wave of the antenna 160 may be adjusted. Since in accordance with the teaching of this invention it is not necessary for the apparatus on all planes or other obstructions to be tuned to a single frequency or in fact necessary to the safety of the equipped plane to have any safety device upon such other planes or obstructions, there may be times in which the transmitted wave should be changed to get the desired results. For example it may be that the particular frequency of transmission is not giving the required signal because of atmospheric or other conditions and the frequency may be changed to one that does. Also it may generally be noted that the safety factor of the dodging apparatus may be controlled by changing the transmitted frequency. With an increase in transmitted frequency, the Doppler effect for any given set of relative speeds of approach will be increased. Such increased Doppler frequency will in effect increase the sensitivity of the obstruction avoiding apparatus and cause the equipped plane to turn away from the obstruction sooner than otherwise. This is true since the increased Doppler frequency will cause greater amplification and a stronger signal to be applied to actuate the plane control mechanism.

Additional devices for improving the selectivity of response to the higher frequencies and for actuation of controls will be found in my copending application Serial Number 426,758 filed January 14, 1942 which is now Patent No. 2,457,393.

In a very simple form of this invention the plane may carry a device which sends radio waves at 3000 megacycles, which is a readily reflectible type of wave, having a length of 0.1 meter. Such waves reflected from an object which is being approached at a relative velocity of 10 miles per hour will be received back on the sending plane at 90 per second higher frequency, producing a beat note at 90 per second in a heterodyne receiver supplied with its base frequency directly by the sending device.

If the rate of approach is 1000 miles per hour the beat note will be 9,000 per second. These frequencies are both within the audible range, hence the beat note may be amplified without change of frequency to produce audible sound. An increase in the pitch of this sound is a direct indication of a corresponding increase in the rate of relative movement. A decreasing volume indicates departure and an increasing volume indicates approach. In one form of the invention, such equipment may be self-contained as it is usable without any connection to the controls of the plane, hence the pilot may carry it with him from plane to plane.

The pilot will in using such a system merely alter his course when a sound of increasing volume is heard, thus eliminating the beat note or changing it to the decreasing volume which indicates departure. The units 180 and 186 of Fig. 9 taken alone represent such a system, using only one of each and making the aerial 188 of 186 non-directional. The only other change required is to connect a loud speaker or a transmitter such as used in telephony in place of the coil 141 of the single 186 employed.

The danger avoiding signals may be responsive to both reflected and directly received waves independently of Doppler effect where it is desired to produce the dodging effect by means of heat, light or other type of wave emanation, omitting the heterodyne devices for obtaining the beat note. In such case the equipped plane will avoid wave energy producing objects such as other planes and will by the reception of reflections of waves sent from the equipped plane also avoid objects which produce no equivalent radiation. The device 180 carried by the equipped plane will then be designed to produce whatever type of wave emanation is selected whether or not it is of the short wave radio type before mentioned in describing this sending apparatus. Since it is desirable to have the receivers responsive to a wide band of frequencies in operating on direct waves as well as on reflected waves, I use heat or light for illustration in connection with Fig. 10, which is taken from my copending application S. N. 426,758, now Patent No. 2,457,393, where it was also Fig. 10.

Fig. 10 shows a modification for use in connection with radiations which are susceptible to refraction with suitable lenses. Lenses, 190L, 190R and 190U, of glass, quartz, plastic or other suitable material are used to offer a minimum resistance to the passage of the wave lengths to be received. These lenses may also serve as windows, they may be located inside of the housing or they may be compound lenses and thus located both ways.

The sensitive elements 192R and 192L of Fig. 10 are thermocouples, thermistors, selenium cells or suitable devices responsive to the type of emanation selected for use. Certain forms of radiant energy, particularly in the range of heat and light, may be focused either by means of reflecting surfaces or by means of lenses as shown in Fig. 10.

For most of the radiations which are likely to be employed, the insulating material 194 of Fig. 10 may be the same as that used to insulate the housings 47 and 48. The shell 196 of Fig. 10 may extend all the way back to the wing or fuselage of the plane carrying the apparatus and form the support for the assembly.

Fig. 11 is a somewhat diagrammatic representation of the device known as an electronic lens. It is to be understood that this type of lens may be substituted for glass lenses when the received emanations are such as to be subject to focusing by an electronic lens.

The receiving elements 192R and 192L of Fig. 10 may be thermally responsive devices such as thermopiles connected in opposition as to potential so that current is generated by the one receiving the greater amount of heat to flow in one direction through the D. C. amplifier 197 or by the other to flow in the opposite direction. The amplifier 197 is assumed to have been adjusted to compensate for differences between the thermopiles, and between amplifier tubes etc. by means of the null or balance control 198.

Current from the amplifier flows in one direction or the other, according to the direction from which the signal is received, through the coil of polar relay 199, thereby moving the armature 107' to make contact so that current from battery 120 flows to one or the other of the contacts 109 or 111 to energize motor 80 for right or left-hand rotation. The wire 115 from terminal 114 of motor 80 leads back to the battery 120. It will be understood that there will be a fourth lens, two more sensitive elements and another amplifier and parts operated thereby if the system is also to control the elevator.

The detection apparatus disclosed herein may be employed on moving craft to detect stationary objects or at stationary points to detect moving objects, as well as on moving craft to detect other moving craft.

It will be noted that in Fig. 10 the received signals are balanced before amplification instead of after, this being an optional feature dependent upon the type of energy to be received and the choice of the more effective or simpler design. Also the switch mechanism which controls the path of current flow to reverse the effect upon a control surface of the plane may be located between two stages of amplification if desired.

Another modification is to employ a two stage relay system on the order of the one shown in Fig. 8 of my copending application Serial No. 426,758, now Patent No. 2,457,393 dated December 28, 1948. This two stage relay is particularly adapted for use where the amplified output of the course following signal is only strong enough to close the first contacts in the relay for slow rotation of the motor and the amplified output of the danger signal is at times strong enough to close the second contacts for higher speed actuation of the control surfaces of the plane, whereby the plane veers more rapidly away from imminent danger.

What is claimed and is desired to be secured by United States Letters Patent is as follows:

1. On an aircraft, a safety control system including a pair of directional receivers arranged with divergent cones of reception, means carried by said aircraft for radiating energy of wave form, said receivers having their peaks of receptivity above the frequency of a major part of said radiated energy and thus being adapted for response to reflections of said radiated energy only when received with its frequency increased by reflection from a relatively approaching object, means for amplifying the received reflections, and steering means for said aircraft, said steering means including power means responsive to the amplified output of the one of said receivers having the greater output to guide said aircraft away from the direction of said object.

2. In a device for directionally locating an object, a pair of energy responsive elements adapted to respond to reflected waves, at least one of said elements being directionally receptive and responsive to a wide band of said waves only when reflected and returned with a compound Doppler effect which increases their frequency, and means for comparing the energy received by one of said elements with the energy received by the other of said elements and including relay means responsive to a difference between the receptions of said elements.

3. An aircraft, means carried by said aircraft adapted to radiate wave energy having the greater part of its volume within a known band of frequencies, and receiving apparatus carried by said aircraft, said receiving apparatus including means providing increasing sensitivity of reception as the received frequencies increase above the frequencies of said known band for the purpose of detecting nearby objects external to said aircraft from which said wave energy is reflected and returned to said aircraft with greater Doppler effect increases of frequency than are other waves.

4. An aircraft, means carried by said aircraft adapted to radiate wave energy having the greater part of its volume within a known band of frequencies, receiving apparatus carried by said aircraft, said receiving apparatus including means providing increasing sensitivity of reception as the received frequencies increase above the frequencies of said known band for the purpose of detecting nearby objects external to said aircraft from which said wave energy is reflected and returned to said aircraft with greater Doppler effect increases of frequency than are other waves, steering means for said aircraft, and power means for actuating said steering means, said power means being energized in response to reception of said reflected wave energy of the higher frequency when two frequencies of reflection are received.

5. In detecting apparatus to be carried on an aircraft on which wave energy is produced with a major part thereof in a known frequency range, a pair of directional receivers tuned to be substantially nonresponsive to waves within said frequency range and to be responsive to higher frequencies of reflections of said wave energy resulting from the Doppler effect of reflection of a portion of said wave energy from objects which are relatively approaching said aircraft, amplifying means for each said receiver, and means for comparing the relative output signals of said amplifying means.

6. An aircraft including sound producing means, sound responsive apparatus carried by said aircraft including a pair of microphones and an amplifier for each said microphone, said sound responsive apparatus including means for making it substantially nonresponsive to the original frequencies of sounds produced by said sound producing means and increasingly responsive to reflections of said sounds as said reflections are increased in frequency by the compound Doppler effect caused by the reflection of said sounds from objects being relatively approached by said aircraft.

7. In combination with an aircraft having a control element for modifying its course and means for emitting wave energy, a motor for actuating said element, a relay device arranged to control the actuation of said element, said relay device including means for starting, stopping and reversing the actuation of said control element, and means responsive to the reception of reflections of said wave energy, said means being more responsive to higher frequency reflections than to lower frequency reflections and the whole being so constructed and arranged that the course of said aircraft is modified in response to the reception of higher frequency reflections rather than in response to the reception of lower frequency reflections.

8. In an aircraft including means for radiating wave energy, a pair of directional receivers carried by said aircraft, said receivers being responsive to reflections of said energy from objects relatively approaching said aircraft, amplifying means for said receivers adapted to cause flow of electric current through a given circuit in one direction in response to the reception of said reflections by one of said receivers and to cause flow of current through said circuit in the opposite direction in response to the reception of said reflections by the other of said receivers, each of said receivers with its associated amplifying means including means for producing an increased output in response to an increase of frequency of the reflections received thereby so that the direction of flow through said circuit is dependent upon the relative frequencies of reflections from two objects one of which is approaching the aircraft at a higher velocity than the other as well as upon the relative strengths of the reflected energy received by the respective receivers from the object which is more directly within the cone of reception of one receiver than of the other.

9. In an apparatus of the character described a radio wave transmitting apparatus, a pair of directional antennas, a radio receiver for each said antenna, each said receiver being operatively connected to receive a signal from the one of said antennas with which it is associated, each said receiver comprising heterodyning means for beating a source of wave energy of a desired frequency against the signal received by said receiver whereby said receiver produces a beat frequency, means for actuating said heterodyning means from said transmitting apparatus whereby said desired frequency is maintained as a function of the transmitted frequency irrespective of any change in frequency of said transmitting apparatus.

10. In an apparatus of the character described, a pair of receiving devices operable upon the reception thereby of wave energy to generate a voltage, one of said devices being sensitive to receive wave energy coming from a first direction, the other of said devices being sensitive to receive wave energy coming from a second direction, electrical circuit means connecting said devices in potential opposing relationship whereby the potential generated by one of said devices opposes that generated by the other of said devices to provide differential output potential, a steering mechanism movable in two directions, and control means for actuating said steering mechanism in either of said directions, said control means being actuatable in response to said differential potential.

11. On an aircraft, means for producing energy waves, a receiver tuned to respond to reflections of said waves when they reach said aircraft at higher frequencies than that at which the original waves were produced, an amplifier including a heterodyne circuit for producing a beat note between the frequency of the reflections thus received and the frequency of the original waves, and means responsive to a change in the frequency of said beat note only when the resultant of the volume and the Doppler effect of the received reflections reaches a point which represents a relatively rapid rate of approach of said aircraft to a relatively nearby object which is capable of reflecting said energy waves.

12. In an aircraft having means for projecting waves therefrom, detection apparatus carried by said aircraft and responsive to reflections of said waves coming from obstructions in the forwardly projected path of said aircraft, said apparatus including a pair of receiving elements tuned to be more responsive to said reflected waves as such waves are shortened by reflection from objects being more rapidly approached by said aircraft, means for balancing the output of one of said elements against the output of the other of said elements including an amplifier for each of said receiving elements, and means responsive to the excess output of one of said amplifiers over that of the other of said amplifiers for guiding said aircraft.

GLENN MUFFLY.

References Cited in the file of this patent

UNITED STATES PATENTS

| Number | Name | Date |
|---|---|---|
| 1,121,563 | Leon | Dec. 15, 1914 |
| 1,958,258 | Alexanderson | May 8, 1934 |
| 2,060,200 | Hammond | Nov. 10, 1936 |
| 2,066,156 | Muffly | Dec. 29, 1936 |
| 2,133,241 | Baker | Oct. 11, 1938 |
| 2,158,584 | Koster | May 16, 1939 |
| 2,382,058 | Hull | Aug. 14, 1945 |
| 2,388,748 | Kopetzky | Nov. 13, 1945 |
| 2,412,003 | Neufeld | Dec. 3, 1946 |
| 2,423,336 | Moseley | July 1, 1947 |
| 2,423,337 | Moseley | July 1, 1947 |
| 2,450,991 | Sanders | Oct. 12, 1948 |
| 2,457,393 | Muffly | Dec. 28, 1948 |
| 2,499,349 | Ayres | Mar. 7, 1950 |